United States Patent
Tessaro et al.

(10) Patent No.: US 12,240,392 B2
(45) Date of Patent: Mar. 4, 2025

(54) GENERATING SOFT SENSORS FOR MECHANICAL SYSTEMS USING SPARSE IDENTIFICATION OF NONLINEAR DYNAMICS

(71) Applicant: Volvo Truck Corporation, Gothenburg (SE)

(72) Inventors: Iron Tessaro, Paraná (BR); Leandro dos Santos Coelho, Paraná (BR); Viviana Cocco Mariani, Paraná (BR); Roberto Zanetti Freire, Paraná (BR)

(73) Assignee: VOLVO TRUCK CORPORATION, Gothenburg (SE)

( * ) Notice: Subject to any disclaimer, the term of this patent is extended or adjusted under 35 U.S.C. 154(b) by 378 days.

(21) Appl. No.: 17/750,209

(22) Filed: May 20, 2022

(65) Prior Publication Data
US 2024/0001947 A1  Jan. 4, 2024

(51) Int. Cl.
*B60R 16/023*  (2006.01)
*B60W 50/00*  (2006.01)

(52) U.S. Cl.
CPC ........ *B60R 16/023* (2013.01); *B60W 2050/0028* (2013.01); *B60W 2510/06* (2013.01)

(58) Field of Classification Search
CPC ........ B60R 16/023; B60W 2050/0028; B60W 2510/06
See application file for complete search history.

(56) References Cited

U.S. PATENT DOCUMENTS

| | | | |
|---|---|---|---|
| 2009/0055126 A1* | 2/2009 | Yanovich | G05B 19/41875 702/179 |
| 2011/0214650 A1* | 9/2011 | Wang | F02D 41/1405 123/703 |
| 2020/0380062 A1 | 12/2020 | Li et al. | |

FOREIGN PATENT DOCUMENTS

| | | |
|---|---|---|
| CN | 113641100 A | 11/2021 |
| WO | 2021079179 A1 | 4/2021 |

OTHER PUBLICATIONS

Brunton, Steven L. et al., "Discovering governing equations from data: Sparse identification of nonlinear dynamical systems," in Proceedings of the National Academy of Sciences, vol. 113, Sep. 2015, pp. 3932-3937.

(Continued)

*Primary Examiner* — Elias Desta
(74) *Attorney, Agent, or Firm* — Sage Patent Group

(57) ABSTRACT

A method of generating a soft sensor for a mechanical system includes defining a training dataset of sensor values received from at least one first sensor corresponding a first physical quantity. The method further includes training a Sparse Identification of Nonlinear Dynamics (SINDy) model using the training dataset to generate a mathematical function defining a relationship between the sensor values and soft sensor values corresponding to a second physical quantity. The method further includes embedding machine readable instructions based on the mathematical function into an embedded system of the mechanical system including at least one first sensor. The machine readable instruc- (Continued)

tions, when executed by the embedded system, cause the embedded system to receive sensor values corresponding to the first physical quantity and generate soft sensor values based on the sensor values and the mathematical function.

20 Claims, 4 Drawing Sheets

(56) References Cited

OTHER PUBLICATIONS

Brunton, Steven L. et al., "Sparse identification of nonlinear dynamics with control (SINDYc)," in FAC-PapersOnLine, vol. 49, No. 18, 2016, pp. 710-715.

Brunton, S. et al., "Sparse identification of nonlinear dynamics (SINDy)," in Data Driven Science and Engineering. (not published), 2017, ch. 3, pp. 288-299.

Bizon, K. et al., "ANN-based virtual sensor for on-line prediction of in-cylinder pressure in a diesel engine," in Computer Aided Chemical Engineering, vol. 33, Elsevier, 2014, pp. 763-768.

Tessaro, Iron et al., "Space and Time Efficiency Analysis of Data-Driven Methods Applied to Embedded Systems," IEEE Symposium Series on Computational Intelligence (IEEE SSCI 2021), Dec. 7, 2022.

Martyr, A. J. et al., "The combustion process and combustion analysis," in Engine Testing, 4th ed. Oxford: Butterworth-Heinemann, 2012, Chapter 15, pp. 375-406.

Lararche, M., Pounder's Marine Diesel Engines and Gas Turbines, 10th ed. Oxford: Butterworth-Heinemann, 2021, Chapter 14, pp. 381-448.

Martyr, A. J. et al., "The combustion process and combustion analysis," in Engine Testing, 5th ed. Oxford: Butterworth-Heinemann, 2021, Chapter 16, pp. 537-597.

* cited by examiner

200

```
┌─────────────────────────────────────────────────────────────────────────┐
│ Define a training dataset of sensor values received from at least one   │
│ first sensor corresponding a first physical quantity                    │
│                              202                                        │
└─────────────────────────────────────────────────────────────────────────┘
                                    │
                                    ▼
┌─────────────────────────────────────────────────────────────────────────┐
│ Train a Sparse Identification of Nonlinear Dynamics (SINDy) model using │
│ the training dataset                                                    │
│                              204                                        │
│  ┌───────────────────────────────────────────────────────────────────┐  │
│  │ Generate a mathematical function defining a relationship between  │  │
│  │ the sensor values and soft sensor values corresponding to a       │  │
│  │ second physical quantity                                          │  │
│  │                            206                                    │  │
│  └───────────────────────────────────────────────────────────────────┘  │
└─────────────────────────────────────────────────────────────────────────┘
                                    │
                                    ▼
┌─────────────────────────────────────────────────────────────────────────┐
│ Embedd machine readable instructions based on the mathematical function │
│ into an embedded system of the mechanical system comprising at least    │
│ one first sensor                                                        │
│                              208                                        │
└─────────────────────────────────────────────────────────────────────────┘
```

*FIG. 2*

GENERATING SOFT SENSORS FOR
MECHANICAL SYSTEMS USING SPARSE
IDENTIFICATION OF NONLINEAR
DYNAMICS

FIELD

Embodiments relate to generating soft sensors, and more particularly to generating soft sensors for mechanical systems using Sparse Identification of Nonlinear Dynamics (SINDy), and related systems and devices.

BACKGROUND

Soft sensors are software-based sensors that generate physical quantities without the need for direct sensor measurements. Soft sensors in embedded system software, for example, in automotive system software, use sensor measurements of different physical quantities to calculate an estimate of the desired physical quantity using mathematical functions and/or algorithms. One approach for creating soft sensors is to use neural networks and their variations to generate a "black box" solution where the dynamics, i.e., underlying equations, are unknown. These solutions can be unreliable and difficult to troubleshoot, however, and may also consume significant computing overhead, e.g., memory and processor power, in the embedded system. Thus, there is a need for a more customizable and serviceable soft sensor with lower computing overhead requirements.

SUMMARY

According to some embodiments, a method of generating a soft sensor for a mechanical system includes defining a training dataset of sensor values received from at least one first sensor corresponding a first physical quantity. The method further includes training a Sparse Identification of Nonlinear Dynamics (SINDy) model using the training dataset to generate a mathematical function defining a relationship between the sensor values and soft sensor values corresponding to a second physical quantity. The method further includes embedding machine readable instructions based on the mathematical function into an embedded system of the mechanical system comprising at least one first sensor. The machine readable instructions, when executed by the embedded system, cause the embedded system to receive sensor values corresponding to the first physical quantity and generate soft sensor values based on the sensor values and the mathematical function.

According to some embodiments, a system includes a processor circuit and a memory comprising machine-readable instructions. When executed by the processor circuit, the instructions cause the processor circuit to define a training dataset of sensor values received from at least one first sensor corresponding a first physical quantity. The instructions further cause the processor circuit to train a Sparse Identification of Nonlinear Dynamics (SINDy) model using the training dataset to generate a mathematical function defining a relationship between the sensor values and soft sensor values corresponding to a second physical quantity. The instructions further cause the processor circuit to embed second machine readable instructions based on the mathematical function into an embedded system of a mechanical system comprising at least one second sensor corresponding to the first physical quantity. The second machine readable instructions, when executed by the embedded system, cause the embedded system to receive sensor values corresponding to the first physical quantity and generate soft sensor values based on the sensor values and the mathematical function.

According to some embodiments, a vehicle includes a first sensor corresponding to a first physical quantity, a processor circuit, and a memory comprising machine readable instructions. When executed by the processor circuit, the machine readable instructions cause the processor circuit to receive sensor values from the first sensor corresponding to the first physical quantity. The instructions further cause the processor circuit to generate soft sensor values based on the sensor values based and a mathematical function, the mathematical function generated by a Sparse Identification of Nonlinear Dynamics (SINDy) model based on a training dataset of sensor values received from at least one second sensor corresponding the first physical quantity.

Other devices, methods, and systems according to embodiments will be or become apparent to one with skill in the art upon review of the following drawings and detailed description. It is intended that all such additional surface compaction machines, methods, and control systems be included within this description and protected by the accompanying claims. Moreover, it is intended that all embodiments disclosed herein can be implemented separately or combined in any way and/or combination.

ASPECTS

According to an aspect, a method of generating a soft sensor for a mechanical system includes defining a training dataset of sensor values received from at least one first sensor corresponding a first physical quantity. The method further includes training a Sparse Identification of Nonlinear Dynamics (SINDy) model using the training dataset to generate a mathematical function defining a relationship between the sensor values and soft sensor values corresponding to a second physical quantity. The method further includes embedding machine readable instructions based on the mathematical function into an embedded system of the mechanical system comprising at least one first sensor. The machine readable instructions, when executed by the embedded system, cause the embedded system to receive sensor values corresponding to the first physical quantity and generate soft sensor values based on the sensor values and the mathematical function.

According to another aspect, the method further includes receiving a sensor value from the at least one first sensor of the mechanical system, and generating, based on the received sensor value, a soft sensor value by the embedded system.

According to another aspect, the second physical quantify comprises a temperature of a component of the mechanical system.

According to another aspect, the method further includes the second physical quantity comprises a peak in-cylinder pressure (PCP) for a vehicle engine.

According to another aspect, the method further includes the second physical quantify comprises a turbocharger speed for a vehicle engine.

According to another aspect, the method further includes the first physical quantity is associated with the vehicle engine. The first physical quantity comprising at least one of a boost pressure, an engine exhaust temperature, an air mass flow, a boost temperature, an ambient air pressure, an engine speed, a piston cooling jet pressure, an air inlet temperature, a coolant temperature, a fuel flow, an oil pressure, a torque value, an exhaust manifold pressure, an exhaust mass flow, and an injection angle.

According to another aspect, the mechanical system comprises a vehicle comprising an engine and an electronic control unit (ECU), and embedding the machine readable instructions into the embedded system comprises embedding the machine readable instructions into the ECU.

According to another aspect, the training dataset comprises a plurality of measured second physical quantity values and a plurality of first measured physical quantity values, each measured second physical quantity value of the plurality of second physical quantity values corresponding to at least one first measured physical quantity value of the plurality of first measured physical quantity values. Training the SINDy model to generate the mathematical function further comprises determining a plurality of coefficients for the mathematical function so that, for each second measured physical quantity value, the mathematical function outputs an approximation of the second measured physical quantity value based on inputting the respective at least one first measured physical quantity value associated with the second measured physical quantity value.

According to another aspect, the mathematical function comprises a polynomial function.

According to another aspect, the mathematical function comprises a trigonometric function.

According to another aspect, the method further includes defining a validation dataset comprising a second plurality of measured second physical quantity values and a second plurality of first measured physical quantity values, each measured second physical quantity value of the second plurality of second physical quantity values corresponding to at least one first measured physical quantity value of the second plurality of first measured physical quantity values. The method further includes inputting the second plurality of first measured physical quantity values into the mathematical function to generate a plurality of soft sensor values. The method further includes comparing the second plurality of second measured physical quantity values to the plurality of soft sensor values.

According to another aspect, the method further includes, based on comparing to second plurality of second measured physical quantity values to the plurality of soft sensor values, determining whether the plurality of soft sensor values are within a predetermined error threshold.

According to an aspect, a system includes a processor circuit and a memory comprising machine-readable instructions. When executed by the processor circuit, the instructions cause the processor circuit to define a training dataset of sensor values received from at least one first sensor corresponding a first physical quantity. The instructions further cause the processor circuit to train a Sparse Identification of Nonlinear Dynamics (SINDy) model using the training dataset to generate a mathematical function defining a relationship between the sensor values and soft sensor values corresponding to a second physical quantity. The instructions further cause the processor circuit to embed second machine readable instructions based on the mathematical function into an embedded system of a mechanical system comprising at least one second sensor corresponding to the first physical quantity. The second machine readable instructions, when executed by the embedded system, cause the embedded system to receive sensor values corresponding to the first physical quantity and generate soft sensor values based on the sensor values and the mathematical function.

According to another aspect, the mechanical system comprises a vehicle comprising an engine and an electronic control unit (ECU), the ECU comprising the embedded system.

According to another aspect, the training dataset comprises a plurality of measured second physical quantity values and a plurality of first measured physical quantity values, each measured second physical quantity value of the plurality of second physical quantity values corresponding to at least one first measured physical quantity value of the plurality of first measured physical quantity values. The first machine readable instructions that train the SINDy model to generate the mathematical function further cause the processor circuit to determine a plurality of coefficients for the mathematical function so that, for each second measured physical quantity value, the mathematical function outputs an approximation of the second measured physical quantity value based on inputting the respective at least one first measured physical quantity value associated with the second measured physical quantity value.

According to another aspect, the mathematical function comprises at least one of a polynomial function and a trigonometric function.

According to another aspect, the first machine readable instructions further cause the processor circuit to define a validation dataset comprising a second plurality of measured second physical quantity values and a second plurality of first measured physical quantity values, each measured second physical quantity value of the second plurality of second physical quantity values corresponding to at least one first measured physical quantity value of the second plurality of first measured physical quantity values. The first machine readable instructions further cause the processor circuit to input the second plurality of first measured physical quantity values into the mathematical function to generate a plurality of soft sensor values. The first machine readable instructions further cause the processor circuit to compare the second plurality of second measured physical quantity values to the plurality of soft sensor values.

According to an aspect, a vehicle includes a first sensor corresponding to a first physical quantity, a processor circuit, and a memory comprising machine readable instructions. When executed by the processor circuit, the machine readable instructions cause the processor circuit to receive sensor values from the first sensor corresponding to the first physical quantity. The instructions further cause the processor circuit to generate soft sensor values based on the sensor values based and a mathematical function, the mathematical function generated by a Sparse Identification of Nonlinear Dynamics (SINDy) model based on a training dataset of sensor values received from at least one second sensor corresponding the first physical quantity.

According to another aspect, the vehicle further includes an engine and an electronic control unit (ECU), the ECU comprising the processor circuit.

According to another aspect, the mathematical function comprises at least one of a polynomial function and a trigonometric function.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 2 is a flowchart of operations for generating soft sensors using SINDy, according to some embodiments;

DETAILED DESCRIPTION OF EMBODIMENTS

Embodiments relate to generating soft sensors, and more particularly to generating soft sensors for mechanical systems using Sparse Identification of Nonlinear Dynamics (SINDy), and related systems and devices. The soft sensors generated by embodiments disclosed herein can efficiently replace, monitor, and/or replicate signals that would be otherwise be directly provided by sensors for a particular physical quantity. Embodiments described below generally relate to embedded systems in vehicles, but it should be understood that the disclosed embodiments have wide applicability to other applications employing embedded systems where it may be desirable to efficiently replace and/or supplement direct measurement of physical quantities with accurate software-based estimates.

Figure 1:
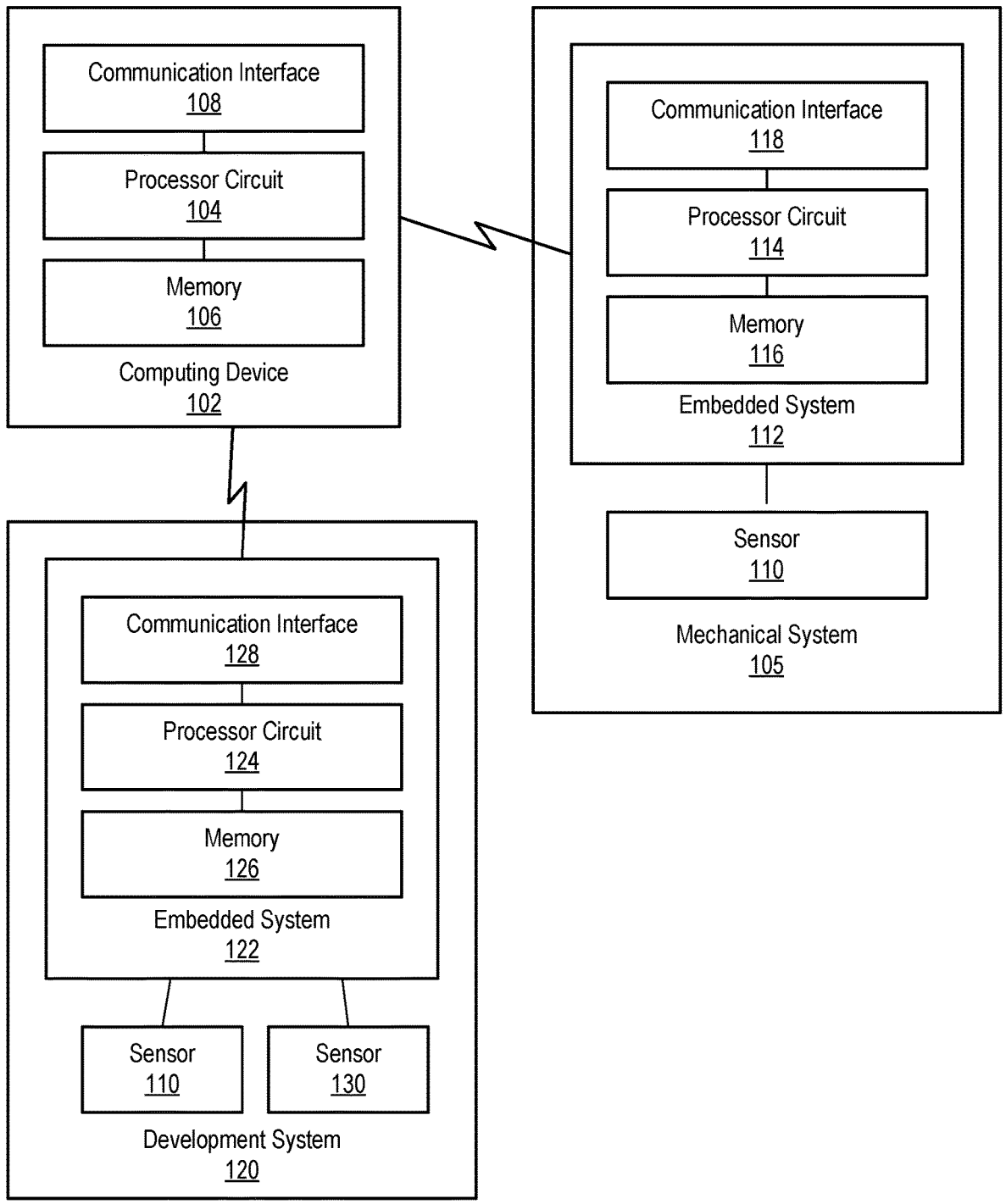
FIG. 1 illustrates a block diagram of a computing system for generating soft sensors using SINDy, according to some embodiments.

FIG. 1 illustrates a block diagram of a computing system 100 for generating soft sensors using SINDy, according to some embodiments. In this example, the system 100 includes a computing device 102 for generating the soft sensors and one or more mechanical systems 105 for implementing the soft sensors generated by the computing device 102.

The computing device 102 includes a processor circuit 105, a memory 106, and a communication interface 108. As will be discussed in greater detail with respect to FIGS. 2 and 3, the computing device 102 uses a training dataset to train a SINDy model to generate a mathematical function defining a relationship between sensor values for a first physical quantity and soft sensor values for second physical quantity. Machine readable instructions based on the mathematical function are embedded into an embedded system 112 of a mechanical system 105.

The mechanical system 105 includes a sensor 110 for measuring the first physical quantity in communication with the embedded system 112. The embedded system 112 including a processor circuit 114 to execute the instructions, a memory 116 to store the instructions, and a communication interface 118 to receive sensor data from the sensor 110 corresponding to the first physical quantity.

The system 100 may also include a development system 120 having an embedded system 122, and associated processor circuit 124, memory 126, and communication interface 128 to receive sensor data for the first physical quantity from a sensor 110 and sensor data for the second physical quantity from another sensor 130. The training dataset may include collected and correlated sensor data from the two sensors 110, 130 for the first and second physical quantities, which may in turn be used by the computing device 102 to generate the soft sensor mathematical function for the second physical quantity.

In this embodiment, the communication interfaces 108, 118, 128 facilitate communicate with each other to transmit and/or receive data, commands, or other information therebetween. Communication can take place over a wired or wireless network or communication connection, as desired. In this example, the computing device 102 is separate from the development system 120, but it should be understood that, in some embodiments, the computing device 102 and the development system may be combined into one device sharing common components, as desired.

The mechanical system 105 may include a vehicle system, but it should also be understood that other systems or devices may be used with embodiments of the disclosure, such as stationary or movable industrial or construction equipment or other systems or devices where direct hardwired sensors can be replaced or supplemented with soft sensors, which can be implemented faster than hardwired sensors, do not demand maintenance, are versatile, and can generate a wide variety of physical measurements.

FIG. 2 is a flowchart of operations 200 for generating soft sensors for a mechanical system, according to some embodiments. The operations 200 may include defining a training dataset of sensor values received from at least one first sensor corresponding a first physical quantity (Block 202). For example, as discussed above, the training dataset can be defined based on data collected by the sensors 110, 130 of the development system 120 of FIG. 1.

The operations 200 may further include training a Sparse Identification of Nonlinear Dynamics (SINDy) model using the training dataset (Block 204). The training may include generating a mathematical function defining a relationship between the sensor values and soft sensor values corresponding to a second physical quantity (Block 206). For example, as discussed above, the computing device 102 can train a SINDy model using the training dataset collected from the development system of FIG. 1 to generate the mathematical function.

The operations 200 may further include embedding machine readable instructions based on the mathematical function into an embedded system of the mechanical system comprising at least one first sensor (Block 208). For example, the instructions can be embedded onto the embedded system 112 of the mechanical system 105 of FIG. 1. The machine readable instructions, when executed by the embedded system, may cause the embedded system 112 to receive sensor values from the sensor 110 of the mechanical system 105 corresponding to the first physical quantity and generate soft sensor values based on the sensor values and the mathematical function.

Figure 3:
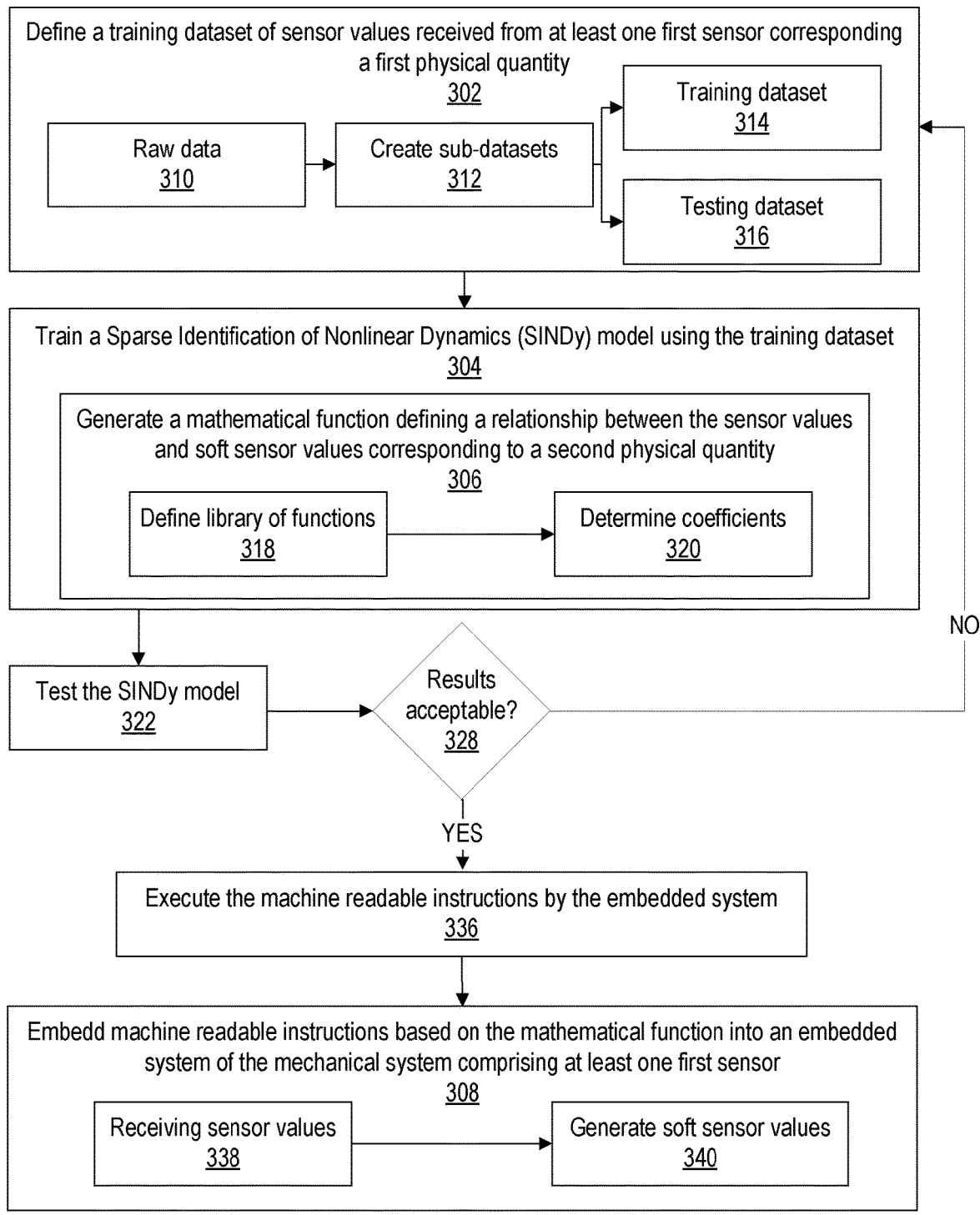
FIG. 3 is a flowchart of more detailed operations for generating soft sensors using SINDy, according to some embodiments.

Referring now to FIG. 3, a flowchart of additional operations 300 for generating soft sensors for a mechanical system is illustrated, according to some embodiments. Similar to the operations 200 of FIG. 2, the operations 300 of FIG. 3 may include defining a training dataset of sensor values received from at least one first sensor corresponding a first physical quantity (Block 302). In this example, defining the training dataset may include processing raw data 310 and to create sub-datasets (Block 312). The sub-datasets may include the training dataset 314 and a testing dataset 316.

The training dataset 314 may include a plurality of measured second physical quantity values and a plurality of first measured physical quantity values, each measured second physical quantity value corresponding to at least one first measured physical quantity value. The raw data 310 used to train and test the SINDy model are collected from the sensor signals from a device, such as the development system 120 of FIG. 1 for example. The collected raw data 310 in this example includes direct measurements of the first quantity, representing an input dataset for the soft sensor, and the second quantity, representing a target dataset for the soft sensor. In this example, the training dataset includes measurement samples x grouped as columns in a matrix X, representing the sensor data input that will be available to the mechanical system, and measurement samples y grouped as a column vector y, representing the physical quantity to be estimated by the soft sensor:

$$X = \begin{bmatrix} x_1^1 & x_1^2 & x_1^3 & \dots & x_1^k \\ x_2^1 & x_2^2 & x_2^3 & \dots & x_2^k \\ \vdots & \vdots & \vdots & \ddots & \vdots \\ x_N^1 & x_N^2 & x_N^3 & \dots & x_N^k \end{bmatrix}, y = \begin{bmatrix} y_1 \\ y_2 \\ \vdots \\ y_N \end{bmatrix},$$

Similar to the operations 200 of FIG. 2, the operations 300 of FIG. 3 may further include training a Sparse Identification of Nonlinear Dynamics (SINDy) model using the training dataset (Block 304). The training may include generating a mathematical function defining a relationship between the sensor values, i.e., the input dataset, and soft sensor values corresponding to a second physical quantity, i.e. the target dataset 314 (Block 306). Generating the mathematical function may include defining a library of functions for SINDy (Block 318). The library of functions may include polynomial functions, trigonometric functions, or other functions of varying complexity, as desired. The data-driven algorithm of SINDy leverages the fact many dynamical systems have relatively few terms on their governing equations. As a result, a library of candidate nonlinear functions, e.g., Q(X)= [1×$X^2$ ... sin (X) sin (2X) ... ], where X is an input dataset, can be analyzed using the training dataset to generate an accurate and efficient mathematical function for the soft sensor. The library of candidate dynamics may be extended to include support for more general nonlinearities, such as polynomials, trigonometric functions, etc., and may also incorporate partial knowledge from the physics of the dynamic system.

Generating the mathematical function in this example further includes determining coefficients (Block 320) for the function(s) using the input dataset and the target dataset of the training dataset 314, to generate a function that accurately and efficiently generates soft sensor values for the second physical quantity. That is, for each second measured physical quantity value, the mathematical function outputs an approximation of the second measured physical quantity value based on inputting a respective first measured physical quantity value.

For example, the dynamic system can be written as a linear system, e.g., $D_{SINDy}$=Q(X)·C, where C is a matrix of coefficients indicating how much of the candidate nonlinear functions in "Q(X)" must be combined (i.e., summed) to represent the dynamic system. With $D_{SINDy}$ as the target dataset y, the system can be approximated for C by left-multiplying both sides of the linear system by the Moore-Penrose pseudoinverse of "Q(X)", [ "Q(X)"] ^A "†", i.e., $Q(X)^\dagger \cdot y = Q(X)^\dagger \cdot Q(X) \cdot C$, resulting in $C \approx Q(X)^\dagger \cdot y \therefore Q(X) \cdot C \approx y$. The coefficients C are then optimized to have as few terms as possible while still meeting predetermined performance and efficiency requirements.

The operations 300 may further include testing the SINDy model (Block 322) using the testing dataset 316. The testing dataset 316 includes an additional input dataset and target dataset, which are used to test and validate the coefficients 320 of the generated mathematical function. The operations 300 further include determining whether the performance and efficiency results are acceptable (Block 328).

As noted above, the testing dataset, or validation dataset, includes a second plurality of measured second physical quantity values and a second plurality of first measured physical quantity values, each measured second physical quantity value corresponding to at least one first measured physical quantity value. The first measured physical quantity values are input into the mathematical function to generate soft sensor values, and the second measured physical quantity values are compared to the soft sensor values to obtain performance and efficiency metrics, such as determining whether the soft sensor values are within a predetermined error threshold.

Metrics for assessing the performance of a data-driven method like SINDy may include the mean squared error (MSE), root mean squared error (RMSE), mean absolute error (MAE), coefficient of determination ($R^2$), etc. These metrics may be compared against predetermined performance and efficiency metrics, such as space (i.e., memory) and time (i.e., processing) values.

If the results are not acceptable, the operations 300 may return to the training operation (Block 304). Alternatively, the operations 300 may include adjusting one or more of the coefficients to modify the mathematical function without retraining the model.

Once the results are determined to be acceptable, the operations 300 of FIG. 3 may further include embedding machine readable instructions based on the mathematical function into an embedded system of the mechanical system (Block 308), similar to the operations 200 of FIG. 2. In this example, the embedded algorithm is the product of the coefficients "C" by the inputs organized as in "Q(X)", but without the terms removed from "C" during its optimization.

The operations 300 may further include executing the machine readable instructions by the embedded system (Block 336). Executing the instructions may include receiving sensor values by the embedded system from a sensor corresponding to the first physical quantity (Block 338), such as the sensor 110 of embedded system 112 of FIG. 2, for example. Executing the instructions may further include generating soft sensor values based on the sensor values and the mathematical function (Block 340).

Figure 4:
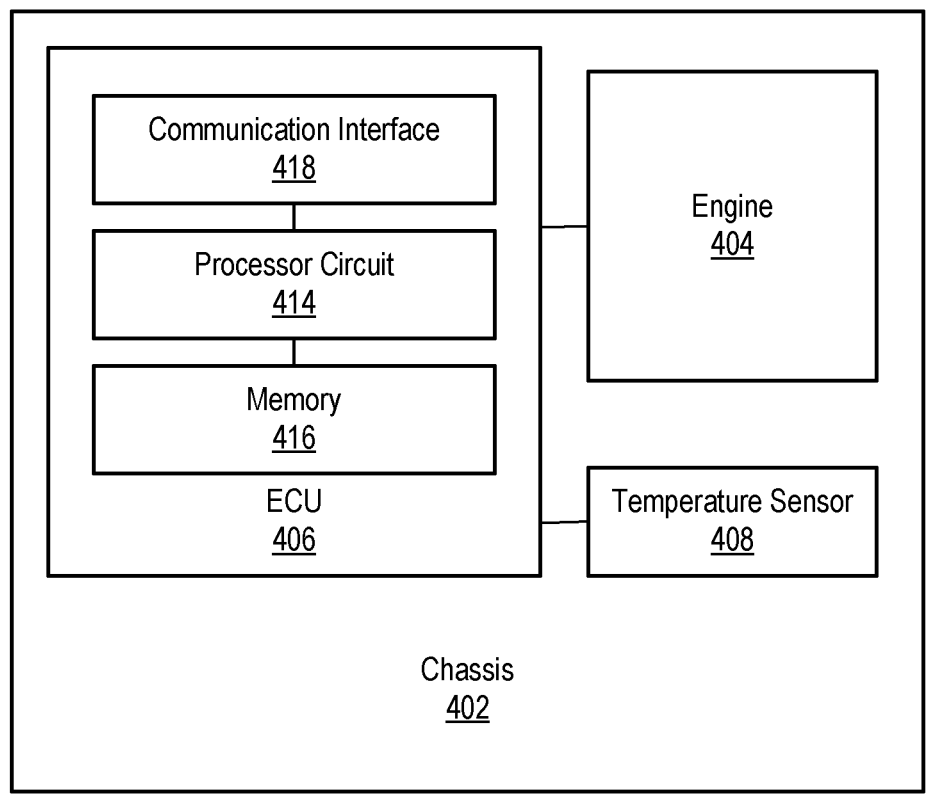
FIG. 4 illustrates a block diagram of a vehicle system for embedding a soft sensor generated by the system of FIG. 1, according to some embodiments.

FIG. 4 illustrates a block diagram of a vehicle system 400 for embedding a soft sensor generated by the system 100 of FIG. 1, according to some embodiments. The vehicle system 400 of this example includes a chassis 402 and an internal combustion engine 404, but it should be understood that many different vehicle configurations may be used. The vehicle system 400 also may include an Electronic Control Unit (ECU) 406 and a number of sensors, such as a temperature sensor 408, but it may not be possible or practical to include direct measurement sensors for all physical properties. Similar to the embedded system 112 of FIG. 1, the ECU 406 may include a processor circuit 414, a memory 416, and a communication interface 418 for communicating with the temperature sensor 408, engine 404, and/or other vehicle components.

For example, it may be desirable to measure a peak in-cylinder pressure (PCP) of the engine 404, which can provide information about the combustion quality in an internal combustion engine, which can in turn be used to identify problems and to improve efficiency during engine calibration. However, while it is possible to measure this property directly using a sensor in a laboratory or development environment, it is extremely difficult to implement such a sensor in a final product due to cost, complexity, safety and other factors.

In this example, training data is collected in a laboratory or development environment that includes temperature data from a temperature sensor corresponding to the temperature sensor 408 of the vehicle system and PCP data from a PCP sensor connected to an engine similar to the engine 404 of the vehicle system 400. The training data is used by a SINDy model to generate a soft sensor that mimics the PCP sensor based on a nonlinear dynamical system, represented by an equation that relates the input temperature sensor data to the target PCP sensor data. After testing, validation, and appropriate modification, the new soft sensor can be embedded into an embedded system 410 of the ECU 406.

The ECU 406 can then receive sensor values from the temperature sensor 408 (and/or other input sensors) and generate soft sensor values based on the sensor values based and the mathematical function of the soft sensor to estimate the corresponding PCP values with a high degree of confidence. Alternatively, or in addition, the soft sensor can be used to monitor and/or validate performance of an actual hardwired sensor in the vehicle system 400, or the hardwired sensor can be used to monitor and/or validate performance of the soft sensor.

It should be understood that soft sensors may be generated and configured to use inputs associated with any number of physical quantities. For example, inputs associated with a vehicle engine may include a boost pressure, an engine exhaust temperature, an air mass flow, a boost temperature, an ambient air pressure, an engine speed, a piston cooling jet pressure, an air inlet temperature, a coolant temperature, a fuel flow, an oil pressure, a torque value, an exhaust manifold pressure, an exhaust mass flow, and an injection angle. Soft sensors can likewise be generated to provide any number of output measurements, such as such as PCP or a turbocharger speed in a vehicle, for example, or any number of other types of mechanical systems.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.,", which derives from the Latin phrase "exempli gratia," may be used to introduce or specify a general example or examples of a previously mentioned item, and is not intended to be limiting of such item. The common abbreviation "i.e.,", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. A method of generating a soft sensor for a mechanical system, the method comprising:
   defining a training dataset of first sensor values received from at least one first sensor corresponding a first physical quantity;
   training a Sparse Identification of Nonlinear Dynamics (SINDy) model using the training dataset to generate a mathematical function defining a relationship between the first sensor values and second soft sensor values corresponding to a second physical quantity; and
   embedding machine readable instructions based on the mathematical function into an embedded system of the mechanical system comprising at least one first sensor, wherein the machine readable instructions, when executed by the embedded system, cause the embedded system to receive third sensor values corresponding to the first physical quantity and generate fourth soft sensor values based on the third sensor values and the mathematical function.

2. The method of claim 1, further comprising:
   receiving a third sensor value from the at least one first sensor of the mechanical system; and
   generating, based on the received third sensor value, a fourth soft sensor value by the embedded system.

3. The method of claim 1, wherein the second physical quantify comprises a temperature of a component of the mechanical system.

4. The method of claim 1, wherein the second physical quantity comprises a peak in-cylinder pressure (PCP) for a vehicle engine.

5. The method of claim 1, wherein the second physical quantify comprises a turbocharger speed for a vehicle engine.

6. The method of claim 5, wherein the first physical quantity is associated with the vehicle engine, the first physical quantity comprising at least one of:
   a boost pressure, an engine exhaust temperature, an air mass flow, a boost temperature, an ambient air pressure, an engine speed, a piston cooling jet pressure, an air inlet temperature, a coolant temperature, a fuel flow, an oil pressure, a torque value, an exhaust manifold pressure, an exhaust mass flow, and an injection angle.

7. The method of claim 1, wherein the mechanical system comprises a vehicle comprising an engine and an electronic control unit (ECU), and
wherein embedding the machine readable instructions into the embedded system comprises embedding the machine readable instructions into the ECU.

8. The method of claim 1, wherein the training dataset comprises a plurality of measured second physical quantity values and a plurality of first measured physical quantity values, each measured second physical quantity value of the plurality of second physical quantity values corresponding to at least one first measured physical quantity value of the plurality of first measured physical quantity values, and
wherein training the SINDy model to generate the mathematical function further comprises determining a plurality of coefficients for the mathematical function so that, for each second measured physical quantity value, the mathematical function outputs an approximation of the second measured physical quantity value based on inputting the respective at least one first measured physical quantity value associated with the second measured physical quantity value.

9. The method of claim 8, wherein the mathematical function comprises a polynomial function.

10. The method of claim 8, wherein the mathematical function comprises a trigonometric function.

11. The method of claim 8, further comprising:
defining a validation dataset comprising a second plurality of measured second physical quantity values and a second plurality of first measured physical quantity values, each measured second physical quantity value of the second plurality of second physical quantity values corresponding to at least one first measured physical quantity value of the second plurality of first measured physical quantity values, and
inputting the second plurality of first measured physical quantity values into the mathematical function to generate a plurality of fifth soft sensor values; and
comparing the second plurality of second measured physical quantity values to the plurality of fifth soft sensor values.

12. The method of claim 11, further comprising, based on comparing to second plurality of second measured physical quantity values to the plurality of fifth soft sensor values, determining whether the plurality of fifth soft sensor values are within a predetermined error threshold.

13. A system comprising:
a processor circuit; and
a memory comprising machine-readable instructions that, when executed by the processor circuit, cause the processor circuit to:
define a training dataset of first sensor values received from at least one first sensor corresponding a first physical quantity;
train a Sparse Identification of Nonlinear Dynamics (SINDy) model using the training dataset to generate a mathematical function defining a relationship between the first sensor values and second soft sensor values corresponding to a second physical quantity; and
embed second machine readable instructions based on the mathematical function into an embedded system of a mechanical system comprising at least one second sensor corresponding to the first physical quantity, wherein the second machine readable instructions, when executed by the embedded system, cause the embedded system to receive third sensor values corresponding to the first physical quantity and generate fourth soft sensor values based on the sensor values and the mathematical function.

14. The system of claim 13, wherein the mechanical system comprises a vehicle comprising an engine and an electronic control unit (ECU), the ECU comprising the embedded system.

15. The system of claim 13, wherein the training dataset comprises a plurality of measured second physical quantity values and a plurality of first measured physical quantity values, each measured second physical quantity value of the plurality of second physical quantity values corresponding to at least one first measured physical quantity value of the plurality of first measured physical quantity values, and
wherein the first machine readable instructions that train the SINDy model to generate the mathematical function further cause the processor circuit to determine a plurality of coefficients for the mathematical function so that, for each second measured physical quantity value, the mathematical function outputs an approximation of the second measured physical quantity value based on inputting the respective at least one first measured physical quantity value associated with the second measured physical quantity value.

16. The system of claim 15, wherein the mathematical function comprises at least one of a polynomial function and a trigonometric function.

17. The system of claim 13, wherein the first machine readable instructions further cause the processor circuit to:
define a validation dataset comprising a second plurality of measured second physical quantity values and a second plurality of first measured physical quantity values, each measured second physical quantity value of the second plurality of second physical quantity values corresponding to at least one first measured physical quantity value of the second plurality of first measured physical quantity values, and
input the second plurality of first measured physical quantity values into the mathematical function to generate a plurality of fifth soft sensor values; and
compare the second plurality of second measured physical quantity values to the plurality of fifth soft sensor values.

18. A vehicle comprising:
a first sensor corresponding to a first physical quantity;
a processor circuit; and
a memory comprising machine readable instructions that, when executed by the processor circuit, cause the processor circuit to:
receive first sensor values from the first sensor corresponding to the first physical quantity; and
generate second soft sensor values based on the first sensor values and a mathematical function, the mathematical function generated by a Sparse Identification of Nonlinear Dynamics (SINDy) model based on a training dataset of first sensor values received from at least one second sensor corresponding the first physical quantity.

19. The vehicle of claim 18, further comprising an engine and an electronic control unit (ECU), the ECU comprising the processor circuit.

20. The vehicle of claim 18, wherein the mathematical function comprises at least one of a polynomial function and a trigonometric function.

* * * * *